United States Patent [19]

Anderson

[11] 4,105,351
[45] Aug. 8, 1978

[54] LEVELING CAMP

[76] Inventor: Robert C. Anderson, Baileys Harbor, Wis. 54202

[21] Appl. No.: 784,624

[22] Filed: Apr. 4, 1977

[51] Int. Cl.² ............................................. F16B 1/00
[52] U.S. Cl. .................................... 403/312; 52/584; 108/64; 269/94
[58] Field of Search ............................ 269/92, 93, 94; 403/312, 310; 52/467, 468, 584, 499, 500, 502; 108/64

[56] References Cited

U.S. PATENT DOCUMENTS

| | | | |
|---|---|---|---|
| 515,836 | 3/1894 | Mueller | 269/94 X |
| 947,009 | 1/1910 | Windeknecht | 52/467 X |
| 1,346,504 | 7/1920 | Mathison | 269/93 |
| 1,966,673 | 7/1934 | Linck | 52/467 X |

FOREIGN PATENT DOCUMENTS

| | | | |
|---|---|---|---|
| 88,303 | 5/1922 | Austria | 52/500 |
| 1,527,839 | 4/1968 | France | 52/502 |

*Primary Examiner*—Andrew V. Kundrat
*Attorney, Agent, or Firm*—Clarence A. O'Brien; Harvey B. Jacobson

[57] ABSTRACT

A first plate is provided and a second plate is disposed generally normal and secured to the first plate centrally intermediate opposite marginal portions thereof with the second plate projecting outwardly from a first side of the first plate and disposed normal to a path extending between the opposite marginal portions of the first plate. An elongated abutment member including opposite end portions and an intermediate portion extending between the opposite end portions is provided and the end portions of the abutment member are offset to one side of the intermediate portion thereof. The intermediate portion of the abutment member has a central opening formed therethrough and the second plate includes an elongated endwise outwardly projecting mounting portion on its outer end remote from the first plate. The abutment member is mounted on the mounting portion with the latter loosely received through the central opening and the aforementioned one side of the intermediate portion opposing the aforementioned first side of the first plate for movement of the abutment member on the mounting portion toward and away from the first plate and the limited angular displacement of the abutment member relative to the mounting portion about an axis generally paralleling the plates. Adjustable displacement means is operatively connected between the mounting portion and the abutment member intermediate portion for adjustable displacement of the abutment member along the mounting portion toward the first plate. Adjacent marginal edges of tabletops may be clamped between the opposite ends of the first plate and the opposite ends of the abutment member, on opposite sides of the second plate, with the surfaces of the tabletops opposing the aforementioned first side of the first plate disposed substantially co-planar.

9 Claims, 6 Drawing Figures

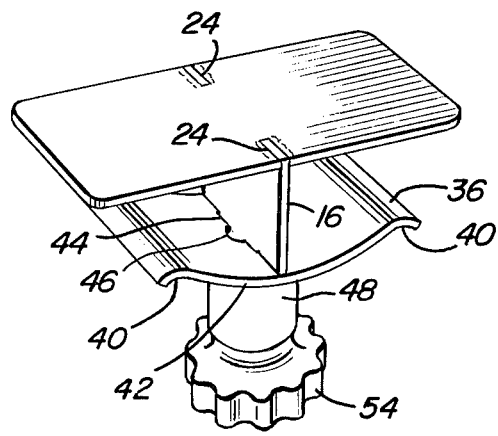
Fig. 1
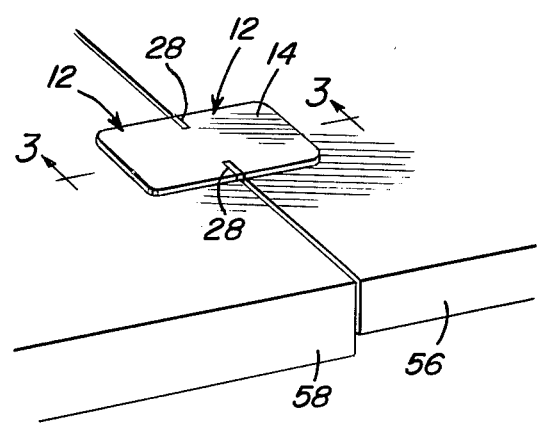
Fig. 2
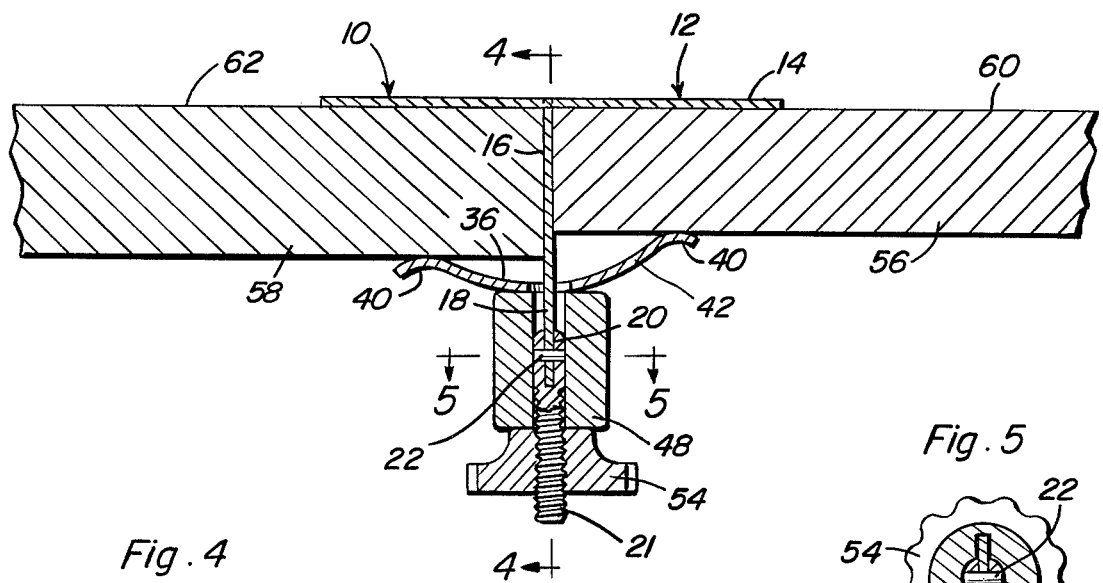
Fig. 3
Fig. 5
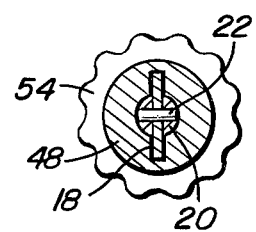
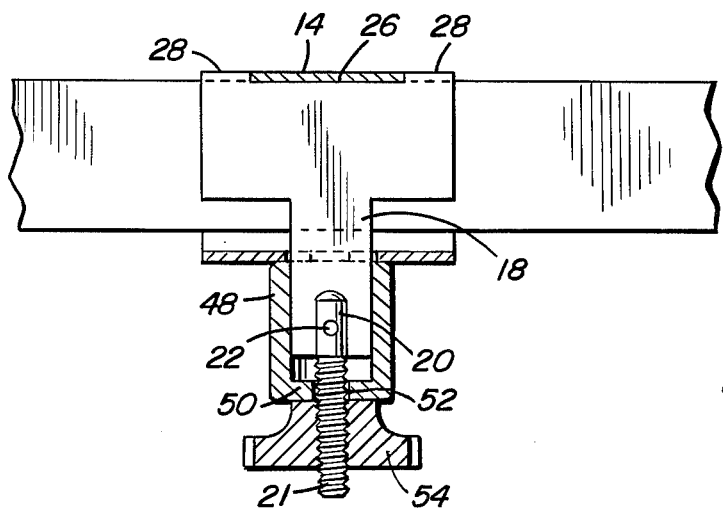
Fig. 4
Fig. 6
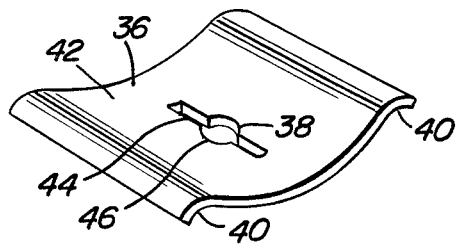

LEVELING CLAMP

BACKGROUND OF THE INVENTION

In many instances, tables utilized in restaurants are disposed in edge-to-edge abutting relation in order to provide a larger table for larger groups of customers. However, persons seated in large groups about a large table can sometimes become more excited and active than usual resulting in the smaller tables placed in side-by-side relation to define a larger table shifting away from each other. In addition, some restaurant tables are of the center pedestal-type and may be tipped with little effort. In such instances when a glass of liquid is disposed on that portion of the tablecloth bridging adjacent side edges of adjacent tables, the tipping of one table relative to another may cause the glass of liquid to be upset. Still further, some restaurants utilizing pedestal tables equipped with vertically adjustable feet invariably have the vertically adjustable feet of different tables adjusted differently with the result that if the two tables are disposed in side-by-side relation the upper surface of one table will be disposed on an elevation different from the upper surface of the other table. Accordingly, a need exists for some means to secure smaller restaurant tables together against separation, against relative tipping and in position with their upper surfaces substantially co-planar.

Examples of clamps and other structures including some of the basic structural and operational features of the instant invention are disclosed in U.S. Pat. Nos. 881,209, 1,293,414, 1,467,057, 2,031,398, 2,694,614 and 3,915,100.

BRIEF DESCRIPTION OF THE INVENTION

The leveling clamp of the instant invention includes a generally T-shaped body constructed of right-angularly disposed plates and an arcuate abutment member is slottably mounted for vertical movement along the base leg defining plate of the T-shaped body and angular displacement about an axis generally paralleling the plates. A thrust nut is threadedly engaged on the lower end of the base leg of the T-shaped body below the abutment member and may be threadedly adjusted in order to force the abutment member upwardly along the base leg of the T-shaped body toward the crosshead of the T-shaped body for clamping adjacent marginal edges of tabletops between the crosshead of the T-shaped body and the abutment member on opposite sides of the base leg of the T-shaped body.

The main object of this invention is to provide a clamp which will be operable to removably clamp adjacent marginal edges of tabletops together against separation, against tipping relative to each other and with the upper surfaces of the tabletops substantially co-planar.

Another object of this invention is to provide a leveling clamp in accordance with the preceding object and which may be readily applied to side-by-side tabletops without the use of tools.

A still further object of this invention is to provide a leveling clamp which may be utilized in conjunction with a pair of tabletops of different thicknesses.

A final object of this invention to be specifically enumerated herein is to provide a leveling clamp in accordance with the preceding objects and which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the leveling clamp of the instant invention;

FIG. 2 is a fragmentary perspective view of a pair of tabletops having closely juxtaposed marginal edge portions and with the leveling clamp of the instant invention operatively associated with the tabletops;

FIG. 3 is an enlarged fragmentary vertical sectional view taken substantially upon the plane indicated by the section line 3—3 of FIG. 2;

FIG. 4 is a fragmentary vertical sectional view taken substantially upon the plane indicated by the section line 4—4 of FIG. 3;

FIG. 5 is a horizontal sectional view taken substantially upon the plane indicated by the section line 5—5 of FIG. 3; and FIG. 6 is a perspective view of the slidable abutment member portion of the leveling clamp.

DETAILED DESCRIPTION OF THE INVENTION

With reference now more specifically to the drawings, the leveling clamp of the instant invention is referred to in general by the reference numeral 10 and includes a generally T-shaped body referred to in general by the reference numeral 12. The body 12 includes a first upper horizontal plate 14 and a second vertical plate 16 having its upper marginal edge portion secured to the first plate 14 centrally intermediate its opposite ends. The plate 16 is disposed at substantially right angles to the plate 14 and the lower end portion of the plate 16 defines a narrow extension 18 of the plate 16. The lower end of the extension 18 has the bifurcated upper end 20 of a threaded shank 21 secured thereto as by a through pin 22.

The upper plate 14 includes a pair of transversely aligned outwardly opening slots 24 formed vertically through the central portions of the opposite side marginal edges thereof and the upper marginal edge of the plate 16 includes a central recess 26 defining a pair of opposite side lugs 28 on opposite sides of the recess 26. The portion of the upper plate 14 extending between the inner ends of the slots or notches 24 is snugly received in the recess 26 and the lugs 28 are snugly received in the slots or notches 24. The plates, thus interengaged, are secured together by welding.

An arcuate abutment member 36 has a central opening 38 formed therethrough and the abutment member 36 is defined by a pair of opposite end portions 40 between which an intermediate portion 42 extends. The opposite end portions 40 are also arcuate, but they are reversely arcuate relative to the curvature of the intermediate portion 42 in which the opening 38 is formed. The opening 38 is defined by an elongated slot 44 extending transversely of the intermediate portion 42 and including a widened central portion 46. The abutment member 36 is slidably mounted on the extension 18 with the latter received through the slot 44 and the shank or shank member 20 received through the widened portion 46. The extension 18 is loosely received through the slot 44 whereby the abutment member 36 may be angularly displaced relative to the extension 18 about an axis paralleling the plates 14 and 16. The abutment member 36 is mounted on the extension 18 with the concave side of the intermediate portion 42 opposing the underside of the plate 14 from which the plate 16 depends and a sleeve 48 including a hollow interior of a cross-sectional shape to slidingly receive the extension 18 and the shank 20 therethrough is slidably mounted on the extension 18 and includes an outer end wall 50 apertured as at 52 remote from the plate 14. The threaded shank 20 extends through the aperture 52 and has a thumb nut 54 threadedly engaged thereon.

In operation, when a pair of different thickness tabletops 56 and 58 are positioned in edge-to-edge opposing relation, the clamp 10, or a pair of clamps 10, may be engaged with the tabletops 56 and 58 in a manner which is believed to be obvious from FIG. 3 of the drawings in order that the tabletops 56 and 58 may be clamped together against displacement away from each other, against relative tipping and with the upper surfaces 60 and 62 of the tabletops 56 and 58 substantially co-planar.

The abutment member 36 is constructed of stiff but somewhat resilient material whereby a yieldable clamping action on the tabletops 56 and 58 may be provided. Further, it is proposed that the clamp 10 will be constructed of metal, with the possible exception of the thrust nut 54 and the sleeve 48 and that a non-corrosive type of metal will be utilized in its construction.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A leveling clamp for clamping a pair of panel members together in edge-by-edge relation and with corresponding side faces of said panel members in substantially co-planar relation, said leveling clamp including a first plate, a second plate disposed generally normal and secured to said first plate centrally intermediate opposite marginal portions of said first plate with said second plate projecting outwardly from one side of said first plate and also disposed normal to a path extending between said opposite marginal portions, an elongated abutment member including opposite end portions and an intermediate portion extending between said opposite end portions, said end portions being offset to one side of said intermediate portion, said intermediate portion having a central opening formed therethrough, said second plate including an elongated endwise outwardly projecting mounting portion on its outer end remote from said first plate, said abutment member being mounted on said mounting portion with the latter loosely received through said opening and said one side of said intermediate portion opposing said one side of said first plate for movement of said abutment member on said mounting portion toward and away from said first plate and limited angular displacement of said abutment member relative to said mounting portion about an axis generally paralleling said plates, and adjustable displacement means operatively connected between said mounting portion and said abutment member intermediate portion for adjustable displacement of said abutment member along said mounting portion toward said first plate, said mounting portion including a narrow plate-like base end portion and a threaded shank outer end portion, said opening comprising a slot extending transversely of said intermediate portion through which said base end portion is slidably received, said adjustable displacement means including a thrust nut threaded on said threaded shank outer end portion, said adjustable displacement means also includes a sleeve slidably mounted on said mounting portion outwardly of said abutment member and inwardly of said thrust nut.

2. The combination of claim 1 wherein said intermediate portion is arcuate extending in the lengthwise direction of said abutment member and opens toward said first plate.

3. The combination of claim 1 wherein said opposite end portions are arcuate with their convex surfaces opposing said first plate.

4. The combination of claim 1 wherein said threaded shank outer end portion includes an inner bifurcated end between whose furcations the outer end of said narrow plate-like base end portion is snugly received and secured.

5. A leveling clamp for clamping a pair of panel members together in edge-by-edge relation and with corresponding side faces of said panel members in substantially co-planar relation, said leveling clamp including a first plate, a second plate disposed generally normal and secured to said first plate centrally intermediate opposite marginal portions of said first plate with said second plate projecting outwardly from one side of said first plate and also disposed normal to a path extending between said opposite marginal portions, an elongated abutment member including opposite end portions and an intermediate portion extending between said opposite end portions, said end portions being offset to one side of said intermediate portion, said intermediate portion having a central opening formed therethrough, said second plate including an elongated endwise outwardly projecting mounting portion on its outer end remote from said first plate, said abutment member being mounted on said mounting portion with the latter loosely received through said opening and said one side of said intermediate portion opposing said one side of said first plate for movement of said abutment member on said mounting portion toward and away from said first plate and limited angular displacement of said abutment member relative to said mounting portion about an axis generally paralleling said plates, and adjustable displacement means operatively connected between said mounting portion and said abutment member intermediate portion for adjustable displacement of said abutment member along said mounting portion toward said first plate, said first plate includes a pair of opposite side transversely aligned and outwardly opening recesses formed in its opposite side marginal portions, the upper marginal edge of said second plate including a central upwardly opening recess formed therein defining a pair of upwardly projecting lugs at the opposite ends of said upper marginal edge, said lugs being snugly received in said opposite side recesses and the portion of said first plate extending between said opposite side recesses being received in said central upwardly opening recess.

6. The combination of claim 5 wherein said intermediate portion is arcuate extending in the lengthwise direction of said abutment member and opens toward said first plate.

7. The combination of claim 6 wherein said mounting portion includes a narrow plate-like base end portion and a threaded shank outer end portion, said opening comprising a slot extending longitudinally of said intermediate portion through which said base end portion is slidably received.

8. The combination of claim 7 wherein said opposite end portions are arcuate with their convex surfaces opposing said first plate.

9. The combination of claim 8 wherein said adjustable displacement means includes a thrust nut threaded on said threaded shank outer end portion.

* * * * *